UNITED STATES PATENT OFFICE 2,368,451

POLYAMINOTRIAZINE - FORMALDEHYDE RESIN MODIFIED WITH A PREFORMED MONO SALT OF A POLYAMINOTRIAZINE

Gaetano F. D'Alelio, Pittsfield, Mass., assignor to General Electric Company, a corporation of New York No Drawing. Application November 15, 1940, Serial No. 365,791

4 Claims. (Cl. 260—72)

This invention relates to the production of new materials, specifically condensation products, having valuable and characteristic properties that make them especially suitable for use in industry, for example in casting, molding, laminating, coating and adhesive applications, and for other purposes. The invention is concerned more particularly with compositions of matter comprising heat - convertible (heat - curable) aminoplasts modified with a preformed (separately prepared), aldehyde-reactable mono salt (organic or inorganic) of an aminotriazine, specifically a polyamino-triazine, e. g., a mono salt of melamine. Still more particularly the invention relates to heat-hardenable resinous compositions obtained by reaction of (1) a preformed mono salt of a polyaminotriazine with (2) a partial reaction product of ingredients including a polyaminotriazine (e. g., melamine) and formaldehyde, the said salt being employed in an amount corresponding to from 0.001 to 0.2 mol thereof per mol of the polyaminotriazine of the reaction product of (2).

The mono salts used in carrying the present invention into effect are produced from aldehyde-reactable mono-, di- or tri-amino-triazines, but preferably are made from amino-triazines having the formula

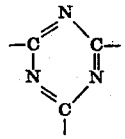

wherein at least one of the free valencies is satisfied by (1) an —NH₂ group or by a substituent containing a terminal —NH₂ group; at least one of the other free valencies is satisfied by (2) an —NHR group or by a substituent containing a terminal —NHR group, where R represents hydrogen or any monovalent organic radical; and the remaining free valency is satisfied by (3) any monovalent substituent grouping, for example the substituent may be the same as (2), or hydrogen, halogen, hydroxy, nitro, cyano, etc., or any monovalent organic radical, e. g., alkyl, aryl (including naphthyl), aralkyl, alkaryl, acyl, hydrocyclic, heterocyclic, etc., radicals, or nitro, halogeno, aceto, carboalkoxy, acetoxy, etc., derivatives of such radicals. The only requirement of the triazine is that it contain at least one aldehyde-reactable —NHR group, where R represents hydrogen or any monovalent atom or radical.

The mono salts may be prepared by the addition of an inorganic or organic acid to an aldehyde-reactable amino-triazine, specifically an aldehyde-reactable polyamino-triazine, in such an amount that the derived product contains a mono-amine salt group. Illustrative examples of organic and inorganic acids that may be used in preparing these mono salts are hydrochloric, hydrobromic, hydroiodic, hydrofluoric, nitric, sulfuric, phosphoric, boric, selenic, chromic, acetic, propionic, butyric, valeric, formic, caproic, acrylic, methacrylic, oxalic, malonic, succinic, glutaric, adipic, lactic, citric, tartaric, malic, maleic, fumaric, itaconic, citraconic, propane tricarboxylic, benzoic, phthalic, salicylic, etc., acids.

The present invention resulted from my discovery that thermosetting resins can be prepared by effecting reaction between ingredients comprising an amino (including imino) or amido (including imido) compound, e. g., aminotriazines, urea, thiourea, etc. (or suitable mixtures thereof), an aldehyde, e. g., formaldehyde, and a preformed mono salt of an aminotriazine such as above described. The invention provides potentially reactive (heat-convertible) aminoplasts and molding compositions that require no additional curing accelerator of the admixed-catalyst type, or other curing reactant, in order to obtain technically useful products. Such aminoplasts may be termed "self-curing aminoplasts."

As is well known, aminoplasts are synthetic resins derived from amino or amido compounds, a typical example being urea-formaldehyde resin (reference: Modern Plastics, vol. 17, No. 2, October, 1939, page 433; Patent 2,214,851, D'Alelio). In the production of aminoplasts it has heretofore been common practice in converting such materials to the insoluble, infusible state to incorporate into the condensation product or into the molding composition a latent or an active (direct) curing catalyst. As pointed out more particularly hereafter, this technique and the final products have not been entirely satisfactory.

In the heat-convertible (heat-hardenable) resinous condensation products of this invention the curing property of the product is imparted thereto by creating a resin molecule having this inherent characteristic. Such resins may be said to be "self-curing" under heat, since the whole resin molecule including the curing reactant that is an integral part thereof cures (hardens) to an insoluble, infusible state. This is a discovery of great practical significance. It makes possible the production of molding compositions of uniform curing characteristics, which compositions yield molded articles free from imperfections such as blisters, discoloration, etc. Such imperfections are due usually to localized curing that often occurs in resinous materials of the admixed-catalyst type. As the value of the molded article, especially light-colored articles, is materially influenced by its appearance, it is clear that the discovery of any means for decreasing or eliminating entirely the production of imperfect articles that must be scrapped or sold at reduced price is of considerable commercial importance.

As a result of my invention the difficulties attendant the production of molding compositions comprising aminoplasts of the admixed-catalyst type are avoided. With such compositions there was, despite the most careful precautions, considerable variation in the curing rates of the individual batches. Considerable variation also was common even among different portions of the same batch of material, as evidenced by the appearance of the cured article.

The resin syrups and molding compositions of this invention may be stored for long periods of time without material alteration. In marked contrast the prior heat-convertible aminoplasts, more particularly those containing direct or active curing catalysts such as hydrochloric, ethyl sulfuric, phthalic, chloroacetic, phosphoric, etc., lacked time or storage stability. This instability on storage also has characterized products obtained by reaction between ureas, aminotriazines, etc., and an aldehyde in the presence of acid condensation catalysts such as hydrochloric acid.

Further, the molding compositions of this invention cure rapidly under heat or under heat and pressure and have good plastic flow during molding. Hence molded articles of even the most complicated designs can be made rapidly and economically. The cured compositions have good color, excellent water resistance and surface finish and, in general, meet the strength, hardness and other requirements of the particular service application.

In producing my new condensation products, which may be described more particularly as co-condensation or inter-condensation products, the choice of the aldehyde component is dependent largely upon economic considerations and the particular properties desired in the finished product. I prefer to use as the aldehyde reactant formaldehyde or compounds engendering formaldehyde, e. g., paraformaldehyde, hexamethylene tetramine, etc. For some applications I may use, for instance, acetaldehyde, propionaldehyde, butyraldehyde, acrolein, methacrolein, crotonaldehyde, benzaldehyde, furfural, etc., mixtures thereof, or mixtures of formaldehyde (or compounds engendering formaldehyde) with such aldehydes.

The amido, imido, amino or imino component may be, for instance, urea, thiourea, diurea, hydroxy urea, ethanol urea, unsymmetrical diphenyl urea, diethylene triurea, methyl urea, acetyl urea, benzoyl urea, phenyl thiourea, asymmetrical diethyl urea, allyl urea, 2-chloroallyl urea, ethylidene urea, methylol ureas, methylene ureas, guanidine, aminotriazines (amino-1,3,5-triazines, amino-1,2,4-triazines, etc.), aminodiazoles, creatinine, guanoline, etc. In many cases the use of an aminotriazine, e. g., melamine, alone or in conjunction with other amido, amino, imido or imino compounds is particularly advantageous. Illustrative examples of aminotriazines are triazines containing at least one amino group, e. g., melamine, ammeline, ammelide, formoguanamine, 2-amino-1,3,5-triazine and their substitution products, etc. Derivatives of melamine may also be employed, e. g., 2,4,6-trihydrazino-1,3,5-triazine, melam, melem, melon, 2,4,6-triethyltriamino-1,3,5-triazine, 2,4,6-triphenyltriamino-1,3,5-triazine, etc. Nuclearly substituted aminotriazines also may be used, e. g., 1-cyano-2-amino-4,6-dimethyl-1,3,5-triazine, 2-chloro-4,6-diamino-1,3,5-triazine, 6-methyl-2,4-diamino-1,3,5-triazine, 2-alkyl-4-amino-6-hydroxy-1,3,5-triazines (for example, 2-methyl-4-amino-6-hydroxy-1,3,5-triazine, etc.), 2-aryl-4-amino-6-hydroxy-1,3,5-triazines (for example, 2-phenyl-4-amino-6-hydroxy-1,3,5-triazine, etc.), and the like. Suitable mixtures of, for example, amino compounds, amido compounds, imido compounds, imino compounds, or amino and amido compounds, imino and amido compounds, amino and imino compounds, etc., such as above mentioned by way of illustration, may be employed. All of these compounds are aldehyde-reactable organic compounds and all contain at least one reactive amino, amido, imino or imido group. The term "amidogen compound" as used generally herein is intended to include within its meaning organic compounds containing at least one active $$-\overset{|}{\underset{}{N}}H$$

group.

In producing these new compositions comprising a condensation product of a plurality of compounds including an amidogen compound, an aldehyde and a preformed, aldehyde-reactable, mono inorganic or organic salt of an aminotriazine, preferably a polyamino-triazine, the initial condensation may be carried out at normal or at elevated temperatures and in the presence or absence of an acid or an alkaline condensing agent or catalyst. Preferably the reaction between the components is started under alkaline conditions.

Any substance yielding an alkaline aqueous solution may be used in obtaining alkaline conditions for the initial condensation reaction. For example, I may use an alkaline material such as sodium, potassium and calcium hydroxides, sodium and potassium carbonate, mono-, di- and tri-amines, etc. Best results are obtained by causing the condensation reaction between the primary components to take place in the presence of a primary condensation catalyst and a secondary condensation catalyst. To obtain condensation products having optimum time- or storage-stability characteristics, I have found that the primary catalyst should be a member of the class consisting of (1) nitrogen-containing basic tertiary compounds that are aldehyde-non-reactable, e. g., tertiary amines such as trialkyl (for example, trimethyl, triethyl, etc.) amines, triaryl (for example, triphenyl, etc.) amines, etc, and (2) nitrogen-containing basic compounds that are aldehyde-reactable, for instance, ammonia, primary amines, e. g., ethyl amine, propyl amine, etc., and secondary amines, e. g., dipropyl amine, dibutyl amine, etc. The secondary condensation catalyst, which ordinarily is used in an amount less than the amount of primary catalyst, should be a fixed alkali, for instance a carbonate, cyanide or hydroxide of an alkali metal (e. g., sodium, potassium, lithium, etc.).

Various ways may be employed for effecting initial reaction between the components. For example, I may first mix all the reactants and effect condensation between the mixed reactants in the presence or absence of addition agents, for instance condensation catalysts, fillers, other natural or synthetic resinous bodies, solvents, diluents, etc. Alternatively, I may add the mono salt to a partial condensation product of an amidogen compound and an aldehyde and effect further condensation between the components.

Or, I may first condense the mono salt with an aldehyde, add the resulting product to a partial condensation product of ingredients comprising an amidogen compound and an aldehyde and then cause the reaction to proceed further. Or, I may separately partially condense (1) an amidogen compound and an aldehyde and (2) a preformed, aldehyde-reactable mono salt of an aminotriazine and an aldehyde, thereafter mixing the two products of partial condensation and effecting further condensation therebetween. Still other ways may be employed in combining the components and in producing the unmodified and modified condensation products of this invention, as will be readily understood by those skilled in the art as the description of the invention proceeds. These condensation reactions may proceed under a variety of time, temperature and pressure conditions. The temperature of the reaction may vary from room temperature to the reflux temperature of the reactants at reduced, atmospheric or superatmospheric pressures.

The products obtained as described above properly may be designated as intermediate condensation products. They are thermosetting resinous bodies which alone or mixed with fillers, pigments, dyes, lubricants, etc., may be used, for example, as molding compositions. The modified and unmodified resinous masses are self-convertible at elevated temperatures to an insoluble, infusible (that is, cured) state.

These intermediate condensation products may be concentrated or diluted further by the addition or removal of volatile solvents to form liquid coating compositions of adjusted viscosity and concentration. The liquid products may be used, for instance, as surface-coating materials, in the production of paints, varnishes, lacquers, enamels, etc., for general adhesive applications, in the production of laminated articles and for numerous other purposes. The liquid intermediate condensation products may be used directly as casting resins. Those intermediate products of a gel-like nature may be dried and granulated to form clear, unfilled, heat-convertible resins.

In order that those skilled in the art better may understand how the present invention may be carried into effect, the following illustrative examples thereof are given. All parts are by weight.

EXAMPLE 1

| | Parts |
|---|---|
| Urea | 600.0 |
| Aqueous solution of formaldehyde (approx. 37.1% HCHO) | 1610.0 |
| Aqueous ammonia (28% NH₃) | 60.0 |
| Sodium hydroxide in 25 parts water | 0.5 |
| Melamine mono-hydrochloride | 2.5 |

All of the above components with the exception of the melamine mono-hydrochloride were mixed and heated for 30 minutes at the boiling temperature of the mass under reflux. The stated amount of melamine mono-hydrochloride was added to the reaction mass and heating under reflux was continued for an additional ten minutes to cause the mono salt to intercondense with the urea-formaldehyde partial condensation product. The resulting hot resinous syrup was mixed with 700 parts alpha cellulose in flock form and 4 parts of a mold lubricant, specifically zinc stearate. The wet compound was dried for 5 hours at 67° C., after which it was molded for 2 minutes at 130° C. under a pressure of 2,000 pounds per square inch. The molded articles did not become distorted when pulled hot from the mold. They were well cured throughout, had a good gloss, were mechanically strong and had excellent resistance to water. When melamine mono-hydrochloride is omitted from the above formulation, uncured articles that readily disintegrate in water are obtained.

EXAMPLE 2

| | Parts |
|---|---|
| Melamine | 252.0 |
| Aqueous solution of formaldehyde (approx. 37.1% HCHO) | 560.0 |
| Aqueous ammonia (28% NH₃) | 12.0 |
| Sodium hydroxide in 120 parts water | 0.48 |
| Melamine mono-hydrochloride | 1.0 |

All of the above components with the exception of the melamine mono-hydrochloride were mixed and heated under reflux at the boiling temperature of the mass for 10 minutes. The melamine mono-hydrochloride was added and the mixture brought to boiling. The hot resinous syrup was mixed with 267 parts alpha cellulose in flock form and 1 part zinc stearate to form a molding compound. The wet compound was dried for 1½ hours at 67° C. The dried compound was molded for 5 minutes at 130° C. under a pressure of 2,000 pounds per square inch. The molded pieces could be pulled hot from the mold without distortion. They were hard and well cured throughout and had a very good gloss and color. Omission of the melamine mono-hydrochloride from the above formula yields uncured molded products.

EXAMPLE 3

*Preparation of resin syrup "A"*

A resin syrup was prepared as described under Example 2 with the exception that 4 parts melamine mono-hydrochloride were used.

*Preparation of resin syrup "B"*

| | Parts |
|---|---|
| Urea | 600.0 |
| Aqueous solution of formaldehyde (approx. 37.1% HCHO) | 1600.0 |
| Aqueous ammonia (28% NH₃) | 60.0 |
| Sodium hydroxide in 10 parts water | 0.4 |

The above components were mixed and heated at boiling temperature under reflux for 30 minutes.

Syrup "A" was added to syrup "B" and the two syrups were thoroughly mixed. The resulting mixture was compounded with 967 parts alpha cellulose in flock form and 4 parts zinc stearate. The wet compound was dried for 9¼ hours at 67° C. Well-cured articles of excellent color and surface appearance were obtained by molding the dried compound for 3 minutes at 130° C. under a pressure of 2,000 pounds per square inch. Uncured molded articles result when the melamine mono-hydrochloride is omitted from the formula of resins syrup "A."

EXAMPLE 4

| | Parts |
|---|---|
| Melamine | 315.0 |
| Urea | 150.0 |
| Aqueous solution of formaldehyde (approx. 37.1% HCHO) | 1000.0 |
| Aqueous ammonia (28% NH₃) | 30.0 |
| Sodium hydroxide in 30 parts water | 0.6 |
| Melamine mono-hydrochloride | 1.9 |

All of the above components with the exception of the melamine mono-hydrochloride were mixed and heated under reflux at the boiling temperature of the mass for 15 minutes. The melamine mono-hydrochloride was added and the mixture brought to boiling. The hot resin syrup was mixed with 475 parts alpha cellulose in flock form and 4 parts zinc stearate to form a molding compound. The wet compound was dried for 3 hours at 63° C. and then for 1½ hours at 75° C. Well-cured molded articles of excellent surface appearance and water resistance were obtained by molding the dried compound for 2 minutes at 130° C. under a pressure of 2,000 pounds per square inch. Omission of the melamine mono-hydrochloride from the above formula yields molded pieces that are uncured and disintegrate in water.

EXAMPLE 5

| | Parts |
|---|---|
| Melamine | 315.0 |
| Thiourea | 190.0 |
| Aqueous solution of formaldehyde (approx. 37.1% HCHO) | 1000.0 |
| Aqueous ammonia (28% NH₃) | 30.0 |
| Sodium hydroxide in 30 parts water | 0.6 |
| Melamine mono-hydrochloride | 1.95 |

The same procedure was followed in making the resin syrup as described under Example 4. The hot syrup was mixed with 490 parts alpha cellulose and 4 parts zinc stearate. The wet compound was dried for 1½ hours at 75° C. Products obtained by molding the dried compound as described in Example 4 were well cured throughout and were much the same in their characteristics as the products of that example. When the melamine mono-hydrochloride is omitted from the above formula, uncured molded pieces that disintegrate in water are obtained.

EXAMPLE 6

| | Parts |
|---|---|
| Melamine | 472.5 |
| Dicyandiamide | 105.0 |
| Aqueous solution of formaldehyde (approx. 37.1% HCHO) | 1200.0 |
| Aqueous ammonia 28% NH₃) | 30.0 |
| Sodium hydroxide in 30 parts water | 0.6 |
| Melamine mono-hydrochloride | 2.04 |

The same procedure was followed in making the resin syrup as described under Example 4. The hot syrup was mixed with 610 parts alpha cellulose in flock form and 4 parts zinc stearate. The wet compound was air dried at room temperature. The dried compound was molded for 5 minutes at 140° C. under a pressure of 2,000 pounds per square inch, yielding well-cured molded articles. Omission of the melamine mono-hydrochloride from the formula yields uncured molded pieces.

Other preformed, aldehyde-reactable mono salts, e. g., melamine mono-acetate, may be substituted for the melamine mono-hydrochloride in the above formulas.

Although the hereindescribed mono salts of amino-triazines provide an accelerated cure of condensation products of, for example, urea and formaldehyde, thiourea and formaldehyde, etc., to an insoluble and infusible state, even better results from the standpoint of the rate of cure and properties of the cured product are obtained when an aminotriazine, specifically melamine, constitutes one of the starting reactants. The aminotriazine may be used alone or in conjunction with urea or the like. Good results are obtained when the amount of the aminotriazine is at least 25 mol per cent of the molar amount of urea, thiourea, dicyandiamide or other material which when condensed with an aldehyde, e. g., formaldehyde, in the absence of an amino-triazine yields a more slowly curing, soluble, fusible condensation product. Preferably I use at least 0.4 mol of the aminotriazine, specifically melamine, for each mol of urea or equivalent material. Obviously higher amounts may be employed, for example from equimolecular proportions of aminotriazine and urea or its equivalent to from 10 to 100 mols of the aminotriazine for each mol of urea or equivalent material.

Because melamine is now the most readily available aldehyde-reactable aminotriazine, I prefer to use organic or inorganic mono salts of melamine in carrying the present invention into effect. However, any other aldehyde-reactable monoamino- or polyamino-triazine (numerous examples of which have been given hereinbefore) may be employed in the preparation of the mono salts, which salts then are used as reactants in preparing the new condensation products of this invention. More specific examples of aldehyde-reactable aminotriazines, of which mono salts may be made, are: 2,4-diamino-1,3,5-triazine (formoguanamine), melam, melem, melon, triamino-triazines wherein one amino group is replaced by another monovalent substituent, for example hydroxy, halogen, alkyl, aryl, aralkyl, alkaryl, etc., more specific examples being 2-phenyl-p-oxy-4,6-diamino-1,3,5-triazine and others in the list of aminotriazines previously mentioned, polyaminotriazines wherein the hydrogen atoms of one or all of the amino groups are partially substituted by other amino groups, e. g., 2,4-diamino-6-hydrazino-1,3,5-triazine, 2-amino-4,6-dihydrazino-1,3,5-triazine, 2,4,6-trihydrazino-1,3,5-triazine, etc., polyaminotriazines wherein the hydrogen atoms of the amino groups are partially substituted by other monovalent substituents (e. g., alkyl, aryl, aralkyl, alkaryl, etc.), for instance 2-amino-4,6-diethylamino-1,3,5-triazine, 4-amino-2,6-diphenylamino-1,3,5-triazine, 2-methylamino-4-amino-6-chloro-1,3,5-triazine, 2,4-diamino-6-phenylamino-1,3,5-triazine, symmetrical trialkyl melamines and triaryl melamines (e. g., 2,4,6-triethyltriamino-1,3,5-triazine, 2,4,6-triphenyltriamino-1,3,5-triazine, etc.), and other substituted and unsubstituted aldehyde-reactable aminotriazines, more particularly polyaminotriazines. Mono salts of aldehyde-reactable aminotriazines other than the aldehyde-reactable amino-1,3,5-triazines may be used, for example mono salts of aldehyde-reactable amino-1,2,4-triazines. I prefer to use aldehyde-reactable polyaminotriazines in forming the mono salts constituting the curing reactants employed in carrying my invention into effect.

The preformed mono salts used in practicing this invention may be represented by the formula

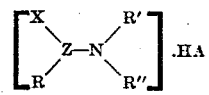

where Z represents the triazine nucleus, R, R' and R'' represent hydrogen or any other monovalent atom or radical, X represents an aldehyde-reactable substituent group, preferably an unsubstituted or a partially substituted amino group, and HA represents an organic or inorganic acid, numerous examples of which were given hereinbefore.

The ratio of the amidogen compound, aldehyde and preformed mono salt to each other may be considerably varied but, in general, it is desirable to use at least one mol of aldehyde for each mol of mixed (total) amidogen compound and mono salt. Good results are obtained by using at least 1½ mols (e. g., from 1¾ to 5 or 6 mols or more) of an aldehyde, specifically formaldehyde, for each mol of total amidogen compound and preformed mono salt. Approximately two to four mols aldehyde per mol total amidogen compound and preformed mono salt usually give very satisfactory results, particularly from the viewpoint of optimum yield of condensation product per unit cost.

The proportion of the preformed, aldehyde-reactable mono salt may be widely varied as desired or as conditions may require, but in most cases is within the range of 0.001 to 0.2 mol of mono salt per mol amidogen compound. Not exceeding substantially 0.1 mol of the mono salt per mol of amidogen compound often is used. Thus, excellent heat-convertible molding compositions are produced by suitably incorporating a filler into a soluble, fusible, normally non-curing but potentially heat-curable, resinous condensation product of ingredients comprising one mol of an aminotriazine, e. g., melamine (or a total of one mol of an aminotriazine and another amidogen compound such as a urea, e. g., urea itself), at least 1½ mols, advantageously 2 to 3 or 4 mols of an aldehyde, e. g., formaldehyde, and not exceeding substantially 0.1 mol of a preformed, aldehyde-reactable mono salt of an aminotriazine, specifically a polyaminotriazine. In general, the amount of the mono salt is so chosen that a heat-hardenable resin of the desired curing rate is obtained.

The fundamental resins of this invention may be varied widely by introducing other modifying bodies before, during or after effecting condensation between the primary components. Thus, as modifying agents I may use, for example, monohydric alcohols such as ethyl, propyl, isopropyl, butyl, amyl, etc., alcohols; polyhydric alcohols such as ethylene glycol, diethylene glycol, glycerine, pentaerythritol, etc.; amides such as formamide, acetamide, stearamide, acrylamide, benzamide, toluene sulfonamide, benzene disulfonamide, benzene trisulfonamide, adipic diamide, phthalamide, etc.; amines such as ethylene diamine, aniline, phenylene diamine, etc.; the aryl sulfonylmorpholines, e. g., benzene mono-, di-, tri- and tetra-sulfonylmorpholines, para-toluene mono-, di-, tri- and tetra-sulfonylmorpholines, etc.; phenols; aminophenols; ketones; etc.

The modifying bodies also may take the form of high molecular weight bodies with or without resinous characteristics, for example hydrolyzed wood products, formalized cellulose derivatives, relignin, proteins, protein-aldehyde condensation products, aniline-aldehyde condensation products, modified or unmodified, saturated or unsaturated, polyhydric alcohol-polybasic acid condensation products, sulfonamide-aldehyde resins, water-soluble cellulose derivatives, natural gums and resins such as copal, shellac, etc.; polyvinyl compounds such as polyvinyl alcohol, polyvinyl acetate, polyvinyl acetals, specifically polyvinyl formal, etc.

Dyes, pigments, plasticizers, mold lubricants, opacifiers and various fillers (e. g., wood flour, glass fibers, asbestos including defibrated asbestos, mineral wool, mica, cloth cuttings, etc.) may be compounded with the resin in accordance with conventional practice to provide molding compositions best fitted to yield molded articles of optimum properties for the particular service application.

The molding compositions of this invention may be molded into a variety of shapes under heat and pressure, more particularly at temperatures of the order of 100° to 200° C., preferably from 120° to 180° C. Molding pressures may be varied considerably, but usually are within the range of 1,000 to 10,000 pounds per square inch, more particularly from 2,000 to 4,000 or 5,000 pounds per square inch.

The modified and unmodified resinous compositions of this invention have a wide variety of uses. For example, in addition to their use in the production of molding compositions, they may be used as laminating varnishes in the production of laminated articles wherein sheet materials, e. g., paper, cloth, sheet asbestos, etc., are coated and impregnated with the resin, superimposed, and thereafter united under heat and pressure. They also may be used in the manufacture of arc-extinguishing tubes capable of evolving an arc-extinguishing gas under the heat of the arc, in the production of wire or baking enamels, and for bonding or cementing together mica flakes to form a laminated mica article. They also may be used as fire retardants and sizings, for example in the treatment of cotton, linen and other cellulosic materials. They also may be used as impregnants for electrical coils.

What I claim as new and desire to secure by Letters Patent of the United States is:

1. A heat-hardenable resinous composition obtained by reaction of (1) a preformed mono salt of a polyaminotriazine with (2) a partial reaction product of ingredients including a polyaminotriazine and formaldehyde, said salt being employed in an amount corresponding to from 0.001 to 0.2 mol thereof per mol of the polyaminotriazine of the reaction product of (2).

2. A heat-hardenable resinous composition obtained by reaction of (1) a preformed mono salt of melamine with (2) a partial reaction product of melamine and formaldehyde, said salt being employed in an amount corresponding to from 0.001 to 0.2 mol thereof per mol of the melamine of the reaction product of (2).

3. A heat-hardenable resinous composition obtained by reaction of (1) a preformed mono salt of melamine with (2) a partial reaction product of urea, melamine and formaldehyde, said salt being employed in an amount corresponding to from 0.001 to 0.2 mol thereof per mol of the sum of the urea and melamine components of the reaction product of (2).

4. A heat-hardenable resinous composition obtained by reaction of (1) a preformed mono salt of melamine with (2) a product of partial reaction, under alkaline conditions, of ingredients including melamine and formaldehyde, said salt being employed in an amount corresponding to from 0.001 to 0.2 mol thereof per mol of the melamine of the reaction product of (2).

GAETANO F. D'ALELIO.